US010757084B1

(12) United States Patent
Yu

(10) Patent No.: US 10,757,084 B1
(45) Date of Patent: Aug. 25, 2020

(54) RETRIEVING ACCESS DATA FOR BLOCKCHAIN NETWORKS USING HIGHLY AVAILABLE TRUSTED EXECUTION ENVIRONMENTS

(71) Applicant: Alibaba Group Holding Limited, George Town (KY)

(72) Inventor: Yirong Yu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/587,541

(22) Filed: Sep. 30, 2019

Related U.S. Application Data

(63) Continuation of application No. PCT/CN2019/080478, filed on Mar. 29, 2019.

(51) Int. Cl.
*H04L 29/06* (2006.01)
*H04L 9/32* (2006.01)
*H04L 9/06* (2006.01)

(52) U.S. Cl.
CPC .......... *H04L 63/062* (2013.01); *H04L 9/0637* (2013.01); *H04L 9/0643* (2013.01); *H04L 9/3247* (2013.01); *H04L 2209/38* (2013.01)

(58) Field of Classification Search
CPC ... H04L 63/062; H04L 9/0637; H04L 9/0643; H04L 9/0866; H04L 9/3247; H04L 2209/38; G06F 21/53; G06F 21/6218
See application file for complete search history.

(56) References Cited

U.S. PATENT DOCUMENTS 10,250,395 B1 4/2019 Bome-Pons et al.
2006/0206616 A1 9/2006 Brown
(Continued)

FOREIGN PATENT DOCUMENTS

CN 107003916 8/2017
CN 107079036 8/2017
(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.
(Continued)

*Primary Examiner* — Amir Mehrmanesh
(74) *Attorney, Agent, or Firm* — Fish & Richardson P.C.

(57) ABSTRACT

Disclosed herein are methods, systems, and apparatus, including computer programs encoded on computer storage media, for retrieving data from external data sources for processing within a blockchain network. One of the methods includes receiving a request for data that includes encrypted data, the encrypted data including access data that is encrypted using a service public key of a key management node; selecting a relay system node from a plurality of relay system nodes that share a service private key of the key management node; transmitting the request to the relay system node; receiving a response provided from the relay system node, the response including result data and a digital signature, wherein the digital signature is generated based on the result data and the service private key of the key management node; and transmitting the response to a client.

18 Claims, 11 Drawing Sheets

(56) References Cited

U.S. PATENT DOCUMENTS

| | | | |
|---|---|---|---|
| 2007/0073876 A1* | 3/2007 | Shima | H04L 41/04 709/224 |
| 2012/0017090 A1* | 1/2012 | Gould | H04L 9/006 713/176 |
| 2016/0191524 A1 | 6/2016 | Bathija et al. | |
| 2017/0270319 A1 | 9/2017 | Salmon-Legagneur et al. | |
| 2017/0352027 A1* | 12/2017 | Zhang | H04L 9/0825 |
| 2017/0359184 A1 | 12/2017 | Camenisch et al. | |
| 2018/0089758 A1 | 3/2018 | Stradling et al. | |
| 2018/0097635 A1 | 4/2018 | Moses | |
| 2018/0191503 A1 | 7/2018 | Alwar et al. | |
| 2018/0204213 A1 | 7/2018 | Zappier et al. | |
| 2018/0219685 A1 | 8/2018 | Deery et al. | |
| 2018/0241572 A1 | 8/2018 | Miele et al. | |
| 2018/0254898 A1* | 9/2018 | Sprague | H04L 9/0866 |
| 2018/0287780 A1* | 10/2018 | Safford | G06F 21/577 |
| 2018/0309567 A1* | 10/2018 | Wooden | H04L 9/06 |
| 2019/0034459 A1 | 1/2019 | Qiu | |
| 2019/0036682 A1 | 1/2019 | Qiu | |
| 2019/0036711 A1 | 1/2019 | Qiu | |
| 2019/0116038 A1* | 4/2019 | Sprague | H04L 9/3213 |
| 2019/0158275 A1* | 5/2019 | Beck | H04L 63/123 |
| 2019/0164153 A1 | 5/2019 | Agrawal et al. | |
| 2019/0164220 A1 | 5/2019 | Raj et al. | |
| 2019/0288854 A1 | 9/2019 | Xie et al. | |
| 2019/0312863 A1* | 10/2019 | Chow | H04L 9/0643 |

FOREIGN PATENT DOCUMENTS

| | | |
|---|---|---|
| CN | 108171083 | 6/2018 |
| CN | 108305170 | 7/2018 |
| CN | 107579826 | 12/2018 |
| CN | 108965342 | 12/2018 |
| CN | 109299338 | 2/2019 |
| CN | 109327512 | 2/2019 |
| EP | 3297206 | 3/2018 |
| WO | WO 2018193355 | 10/2018 |

OTHER PUBLICATIONS

Nakamoto, "Bitcoin: A Peer-to-Peer Electronic Cash System," www.bitcoin.org, 2005, 9 pages.

Software.intel.com [online], "Add Enhanced Security to Your Application," 2019, retrieved on Nov. 26, 2019, retrieved from URL<https://software.intel.com/en-us/sgx/details>, 3 pages.

Software.intel.com [online], "Develop & Deliver More Secure Solutions," 2019, retrieved on Nov. 26, 2019, retrieved from URL<https://software.intel.com/en-us/sgx>, 5 pages.

Software.intel.com [online], "Enhanced Security Features for Applications and Data In-use," 2019, retrieved on Nov. 26, 2019, retrieved from URL<https://software.intel.com/sites/default/files/managed/c3/8b/intel-sgx-product-brief-2019.pdf>, 4 pages.

Wikipedia.org [online], "Trusted execution environment," Nov. 18, 2019, retrieved on Nov. 26, 2019, retrieved from URL<https://en.wikipedia.org/wikiiTrusted_execution_environment>, 6 pages.

Zhang et al., "Town Crier: An Authenticated Data Feed for Smart Contracts," The 23rd ACM Conference on Computer and Communicaions Security, Oct. 2016, 20 pages.

Ellis et al. [online], "ChainLink A Decentralized Oracle Network," Sep. 2017, retrieved on Nov. 26, 2019, retrieved from URL<https://link.smartcontract.com/whitepaper>, 38 pages.

Github.com [online], "Ontology Oracle," Jan. 10, 2019, retrieved on Nov. 26, 2019, retrieved from URL (https://github.com/ontio/ontology-oracle>, 10 pages.

PCT International Search Report and Written Opinion in International Appl. No. PCT/CN2019079800, dated Jan. 2, 2020, 7 pages.

PCT International Search Report and Written Opinion in International Appl. No. PCT/CN2019080478, dated Dec. 30, 2019, 9 pages.

PCT International Search Report and Written Opinion in International Appl. No. PCT/CN2019096030, dated Dec. 27, 2019, 6 pages.

PCT International Search Report and Written Opinion in International Appl. No. PCT/CN2019096032, dated Dec. 27, 2019, 6 pages.

PCT International Search Report and Written Opinion in International Appl. No. PCT/CN2019096036, dated Jan. 2, 2020, 7 pages.

software.intel.com [online], "Intel Software Guard Extensions", 2019, retrieved on Nov. 26, 2019, retrieved from URL <https://software.intel.com/en-us/sgx>, 5 pages.

Extended European Search Report in European Application No. 19732236.5, dated May 18, 2020, 8 pages.

* cited by examiner

RETRIEVING ACCESS DATA FOR BLOCKCHAIN NETWORKS USING HIGHLY AVAILABLE TRUSTED EXECUTION ENVIRONMENTS

CROSS-REFERENCE TO RELATED APPLICATIONS

This application is a continuation of PCT Application No. PCT/CN2019/080478, filed on Mar. 29, 2019, which is hereby incorporated by reference in its entirety.

TECHNICAL FIELD

This specification relates to providing data to a blockchain network from an external data source.

BACKGROUND

Distributed ledger systems (DLSs) enable participating entities to securely, and immutably store data. DLSs can also be referred to as consensus networks or blockchain networks, without referencing any particular use case. Examples of blockchain network can include consortium blockchain networks provided for a select group of entities. A consortium blockchain network can control the consensus process for the select group of entities. A consortium blockchain network includes an access control layer.

Smart contracts are programs that execute on blockchain networks. A smart contract contains a set of pre-defined rules under which the parties to that smart contract agree to interact with each other. In some instances, the smart contract running on the blockchain network requires input from outside of the blockchain network to evaluate pre-defined rules and perform corresponding actions. However, the smart contract itself cannot directly access external data sources. Consequently, a relay agent can be used to retrieve external data, and submit the data to the blockchain network for processing by the smart contract. This process, however, can result in security issues, such as potential attack vectors (e.g., distributed denial-of-service (DDoS) attacks).

Although techniques have been proposed for addressing security issues associated with data retrieval from external data sources, a more effective solution to address the security issues would be advantageous.

SUMMARY

This specification describes technologies for retrieving data from external data sources for processing within a blockchain network. These technologies generally involve providing a shared service private key to a plurality of relay system nodes in a multi-node cluster through a key management node, such that clients can avoid performing repeated attestation of the relay system nodes when requesting data from a data source through the relay system nodes. In some embodiments, remote attestation is performed for a key management node, the remote attestation resulting in a service key pair (service public key, service private key) of the key management node. The service public key is obtained and stored by the clients during the remote attestation. The key management node operates using a trusted execution environment (TEE). The remote authentication of the key management node can be audited publicly, eliminating the need for individual clients to repeat remote authentication. In some embodiments, a key distribution process is performed by the key management node for a plurality of relay system nodes in a multi-node cluster, the key distribution process resulting the same service private key being distributed to each of the relay system nodes. Each client request is assigned by a relay system smart contract to an available relay system node in the multi-node cluster for querying the external data source. A response that includes the result of the query is digitally signed using the service private key. The response can be verified by the clients using the service public key.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
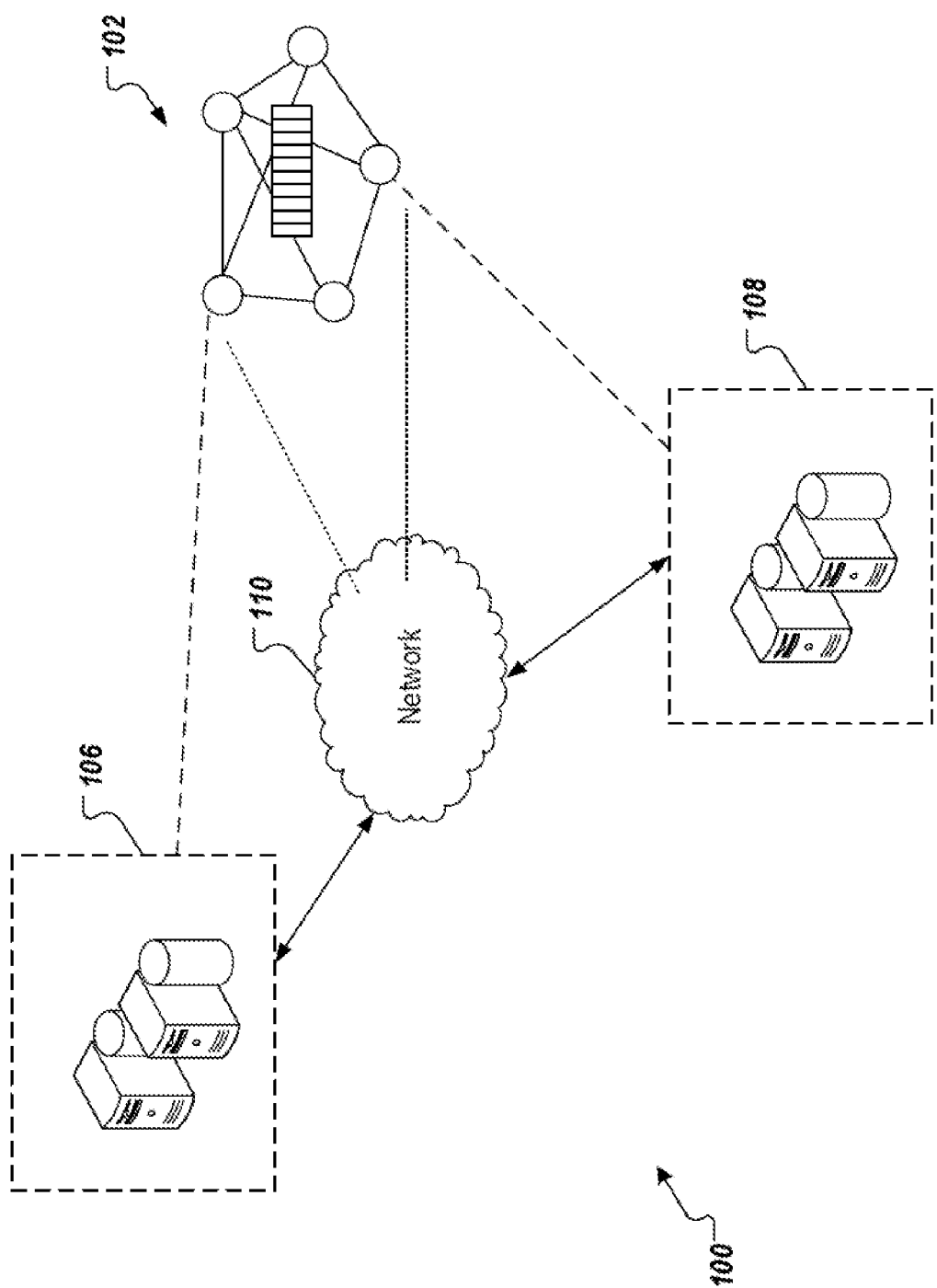
FIG. 1 is a diagram illustrating an example of an environment that can be used to execute embodiments of this specification.

This specification describes technologies for retrieving data from external data sources for processing within a blockchain network. These technologies generally involve providing a shared service private key to a plurality of relay system nodes in a multi-node cluster through a key management node, such that clients can avoid performing repeated attestation of the relay system nodes when requesting data from a data source through the relay system nodes. In some embodiments, remote attestation is performed for a key management node, the remote attestation resulting in a service key pair (service public key, service private key) of the key management node. The service public key is obtained and stored by the clients during the remote attestation. The key management node operates using a trusted execution environment (TEE). The remote authentication of the key management node can be audited publicly, eliminating the need for individual clients to repeat remote authentication. In some embodiments, a key distribution process is performed by the key management node for a plurality of relay system nodes in a multi-node cluster, the key distribution process resulting the same service private key being distributed to each of the relay system nodes. Each client request is assigned by a relay system smart contract to an available relay system node in the multi-node cluster for querying the external data source. A response that includes the result of the query is digitally signed using the service private key. The response can be verified by the clients using the service public key.

The subject matter described in this specification as provided in particular embodiments realizes one or more of the following technical effects. In some embodiments, a key management node for distributing a service private key to a plurality of relay system nodes is provided. As described herein, a remote attestation can be performed for the key management node, which eliminates the need for each client to independently perform remote attestation of the relay system nodes. This generally alleviates network bottlenecks caused by the individual attestation of the relay system nodes from each client. Furthermore, a relay system smart contract for selecting an available relay system node from a plurality of relay system nodes is provided. As described herein, with the relay system nodes being deployed in a cluster, the relay system smart contract can automatically assign client request to an available relay system node in the cluster, reducing service unavailability due to individual relay system node failure. As such, the embodiments of this specification improve the overall service availability of the relay system nodes for querying Internet data source. In some embodiments, the relay system smart contract facilitates avoiding a direct contact between the client and the relay system nodes, thereby avoiding exposing a position or access point of the relay system nodes. As such, the relay system nodes are less likely to be found and attacked by malicious actors over the network in many forms, such as, for example, distributed denial of service (DDoS) attacks. This improves a security of the relay system nodes, thereby further improving a security of the communication between the clients and the relay system nodes.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
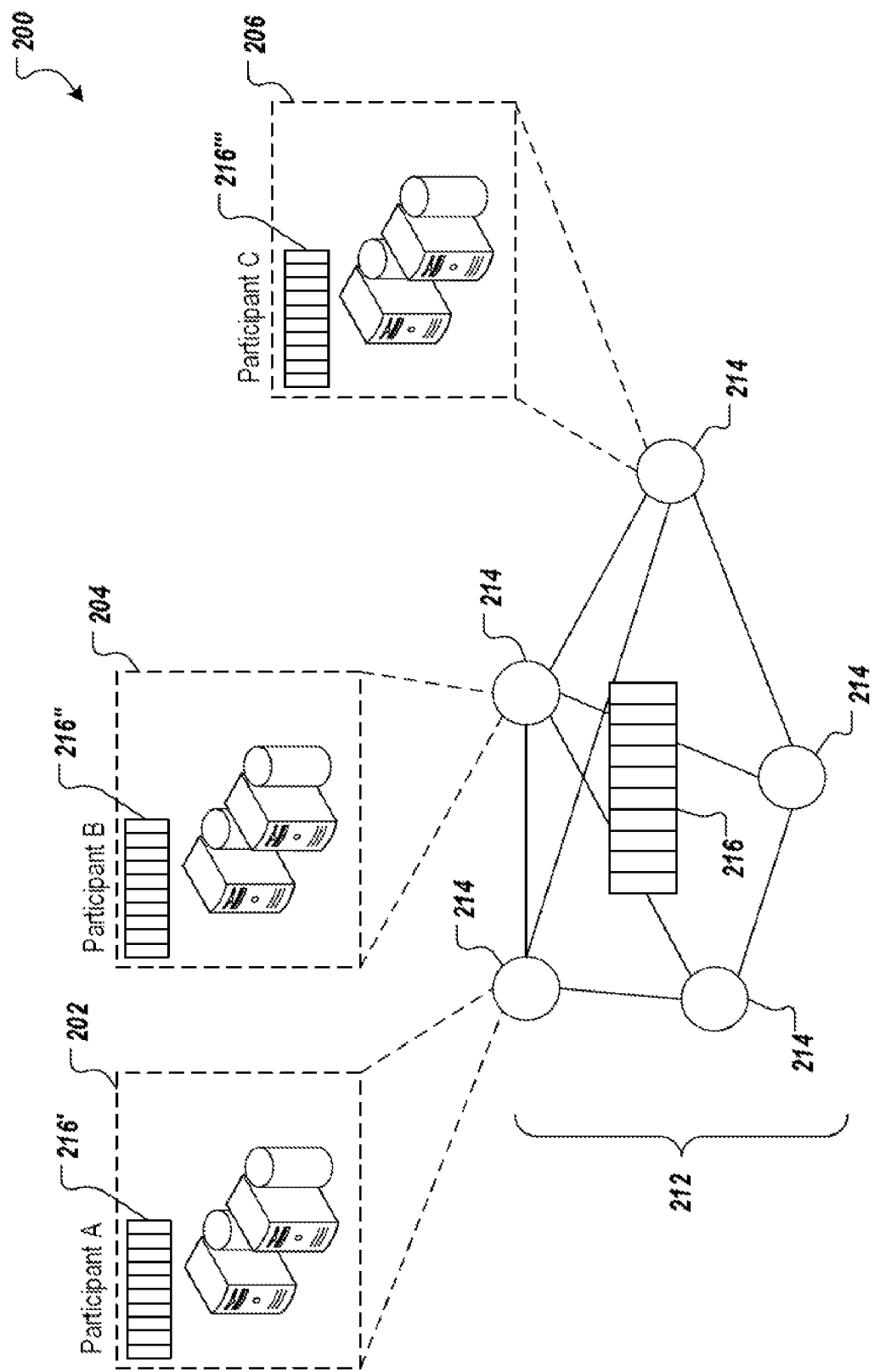
FIG. 2 is a diagram illustrating an example of an architecture in accordance with embodiments of this specification.

FIG. 2 is a diagram illustrating an example of an architecture 200 in accordance with embodiments of this specification. The conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of a non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, so that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, nodes of the blockchain network, and/or nodes that communicate with the blockchain network can operate using TEEs. At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that embodiments of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), to name a few. In operation, the TA runs and creates an enclave within the PRM of the memory. A trusted function executed by the trusted portion within the enclave is called by the untrusted portion, and the code executing within the enclave sees the data as plaintext data (unencrypted), and external access to the data is denied. The trusted portion provides an encrypted response to the call, and the TA continues to execute.

An attestation process can be performed to verify that expected code (e.g., the trusted portion of the TA) is securely executing within the SGX-provided TEE. In general, the attestation process includes a TA receiving an attestation request from a challenger (e.g., another node in the blockchain network, or a key management system (KMS) of the blockchain network). In response, the TA requests that its enclave produce a remote-attestation, also referred to as a quote. Producing the remote-attestation includes a local-attestation being sent from the enclave to a so-called quoting enclave, which verifies the local-attestation, and converts the local-attestation into the remote-attestation by signing the local-attestation using an asymmetric attestation key. The remote-attestation (quote) is provided to the challenger (e.g., the KMS of the blockchain network).

The challenger uses an attestation verification service to verify the remote-attestation. For SGX, Intel provides the Intel Attestation Service (IAS), which receives the remote-attestation from the challenger, and verifies the remote-attestation. More particularly, the IAS processes the remote-attestation, and provides a report (e.g., attestation verification report (AVR)), which indicates whether the remote-attestation is verified. If not verified, an error can be indicated. If verified (the expected code is securely executing in the TEE), the challenger can start, or continue interactions with the TA. For example, in response to the verification, the KMS (as challenger) can issue asymmetric encryption keys (e.g., a public-key and private-key pair) to the node executing the TEE (e.g., through a key exchange process, such as elliptical curve Diffie-Hellman (ECDH)) to enable the node to securely communicate with other nodes, and/or clients.

In some blockchain networks, so-called smart contracts can be executed. Smart contracts can be described as digital representations of real-world, legal contracts having contractual terms affecting various parties. A smart contract is implemented, stored, updated (as needed), and executed within, in the example context, a consortium blockchain network. Contract parties associated with the smart contract (e.g., buyers and sellers) are represented as nodes in the consortium blockchain network. In some examples, the contract parties can include entities (e.g., business enterprises) that are associated with the smart contract (e.g., as parties to the smart contract).

In further detail, smart contracts are provided as computer-executable programs that execute on blockchains (e.g., a node within a blockchain network). A smart contract contains a set of pre-defined rules under which the parties to that smart contract agree to interact with each other. If the pre-defined rules of the smart contract are met, the agreement defined in the smart contract is automatically enforced. A smart contract is usually tamper resistant and facilitates, verifies, and enforces the negotiation or performance of an agreement or transaction.

In some instances, a smart contract executing within the blockchain network requires input from outside of the blockchain network to evaluate pre-defined rules and perform corresponding actions. By way of non-limiting example, a stock quote might be needed for the smart contract to base a decision on, the stock quote coming from a data source external to the blockchain network. As another non-limiting example, account information for an account that is maintained outside of the blockchain network might be needed for the smart contract to base a decision on. However, the smart contract itself may not be able to directly query external data sources.

In some embodiments, a relay agent can be used to retrieve external data, and submit the data to the blockchain for processing by the smart contract. This process, however, can result in security issues, such as leakage of secure information (e.g., credentials that might be required to access an external data source). In some cases, TEE can be used to prove that the relay agent has performed the specified query request honestly. However, due to the openness of the blockchain, all query requests are visible to all users (nodes) in the blockchain network. Consequently, there is a risk that request strings can be intercepted, modified and replayed, resulting in information leakage and other security issues.

In some cases, SGX, the TA, or portion of the TA can be used to execute in an enclave (enclave program) functions as a relay node to access external data sources. For example, the enclave program can send a query request (e.g., HTTPS request) to an Internet-based data source and can provide the response to the smart contract that initiated the request. In some examples, a privacy field function is provided, which can be used to encrypt sensitive information (e.g., access credentials) using the public key of the enclave. In some examples, the relay node uses the private key of the enclave to decrypt the privacy field, invokes the HTTPS client to access the target Internet-based data source, receive the requested data, and use the private key to digitally sign the returned data. After the digital signature, the data is returned to the smart contract that had initiated the request.

In some examples, the relay system node implementing the enclave program is verified during a remote attestation process. Each client request can be processed by the verified relay system node for retrieving data from a data source.

Such an approach, however, may have disadvantages. An example disadvantage of using a certain relay system node for data retrieval is that if the relay system node fails or is inaccessible, the client request cannot be processed correctly, resulting in service unavailability.

In some embodiments, external data sources (e.g., Internet-based data sources) can be queried by any one of a plurality of relay system nodes sharing a service private key and TEE. Thus, each client does not have to independently perform remote attestation of the relay system nodes, and thereby alleviating the network bottleneck caused by the individual attestation of the relay system nodes from each client and reducing the workload of a server or computer for handling the attestations. Furthermore, the relay system nodes can be deployed in a cluster, and each client request can be automatically assigned to an available relay system node in the cluster. In this manner, service availability can be improved because individual relay system node failure would not lead to service unavailability.

Figure 3:
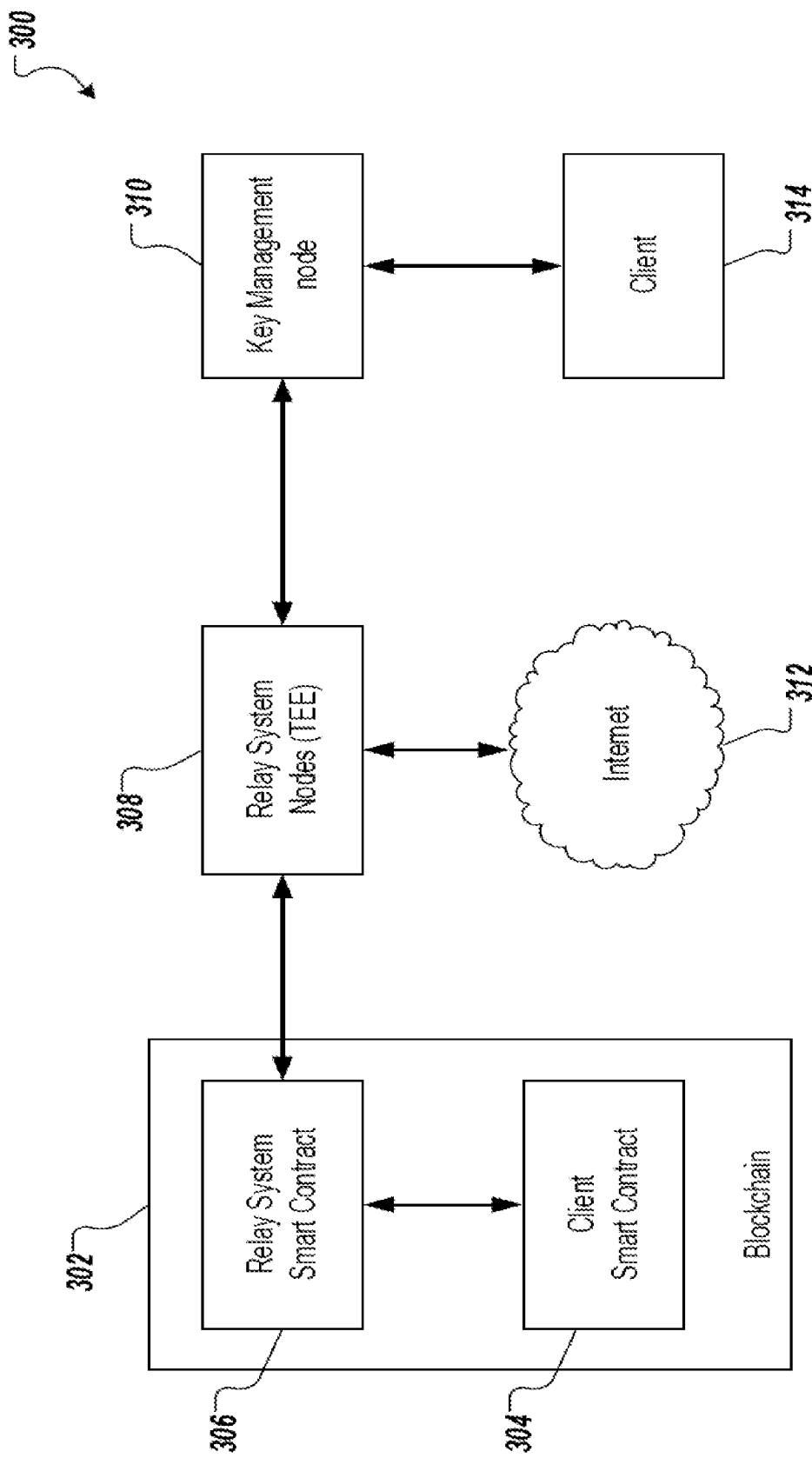
FIG. 3 is a diagram illustrating an example of a system in accordance with embodiments of this specification.

FIG. 3 is a diagram illustrating an example of a system 300 in accordance with embodiments of this specification. As shown, system 300 includes a blockchain 302, a plurality of relay system nodes 308 forming a multi-node cluster, a key management node 310, a network 312 (e.g., Internet), and a client 314 (e.g., a client computing device). In the depicted example, the blockchain 302 includes a client smart contract 304 and a relay system smart contract 306. In some embodiments, the relay system nodes 308 and the key management node 310 are implemented using a TEE technology (e.g., Intel SGX). In general, the relay system smart contract 306, the relay system nodes 308, and the relay management node 310 provide a relay system that enables data that is external to the blockchain 302 to be retrieved from the internet data source, and used within the blockchain 302.

The client smart contract 304 is a smart contract \that requests data or service from data sources on the network 312. The relay system smart contract 306 is a smart contract that acts as a front end of the blockchain 302 within the relay system. The relay system smart contract 306 implements an application program interface (API) for the client smart contract 304 to use for processing and relaying data from the client smart contract 304 to the other components of the relay system (e.g., the relay system nodes 308), and vice versa.

The relay system node 308 can be implemented on any suitable server, computer, module, or computing element for retrieving data from external data source in the network 312 in response to a data request from the blockchain 302. For example, the relay system node 308 may receive and handle off-chain data or service requests from client smart contract 304 and query external data sources in the network 312, for example, HTTPS-enabled Internet services.

The key management node 310 can be implemented on any suitable server, computer, module, or computing element for managing cryptographic keys that are used for retrieving data from external data source. As discussed herein, the cryptographic keys include a service public key and a service private key that are generated by the key management node 310, where the service private key can be used for signing request results and the service public key can be used for authenticating the request results.

Generally, the data retrieval process can include three phases. A first phase includes a remote attestation process where the client 314 authenticates the key management node 310 and obtains an authentication key (e.g., a service public key) of the key management node 310. At a second phase, the key management node 310 distributes a signing key (e.g., a service private key) to each of the relay system nodes 308 in the multi-node cluster such that all relay system nodes 308 share the same signing key. A third phase includes a data request process where the client 314 acquires authorized data from an external data source through the relay system. At the third phase, the data is acquired through the relay system by a relay system node 308 that queries the network 312 and uses its service private key to sign a request result and the client 314 can use its service public key to authenticate the request result. The three phases will be discussed below in additional detail with reference to FIGS. 4-10.

Figure 4:
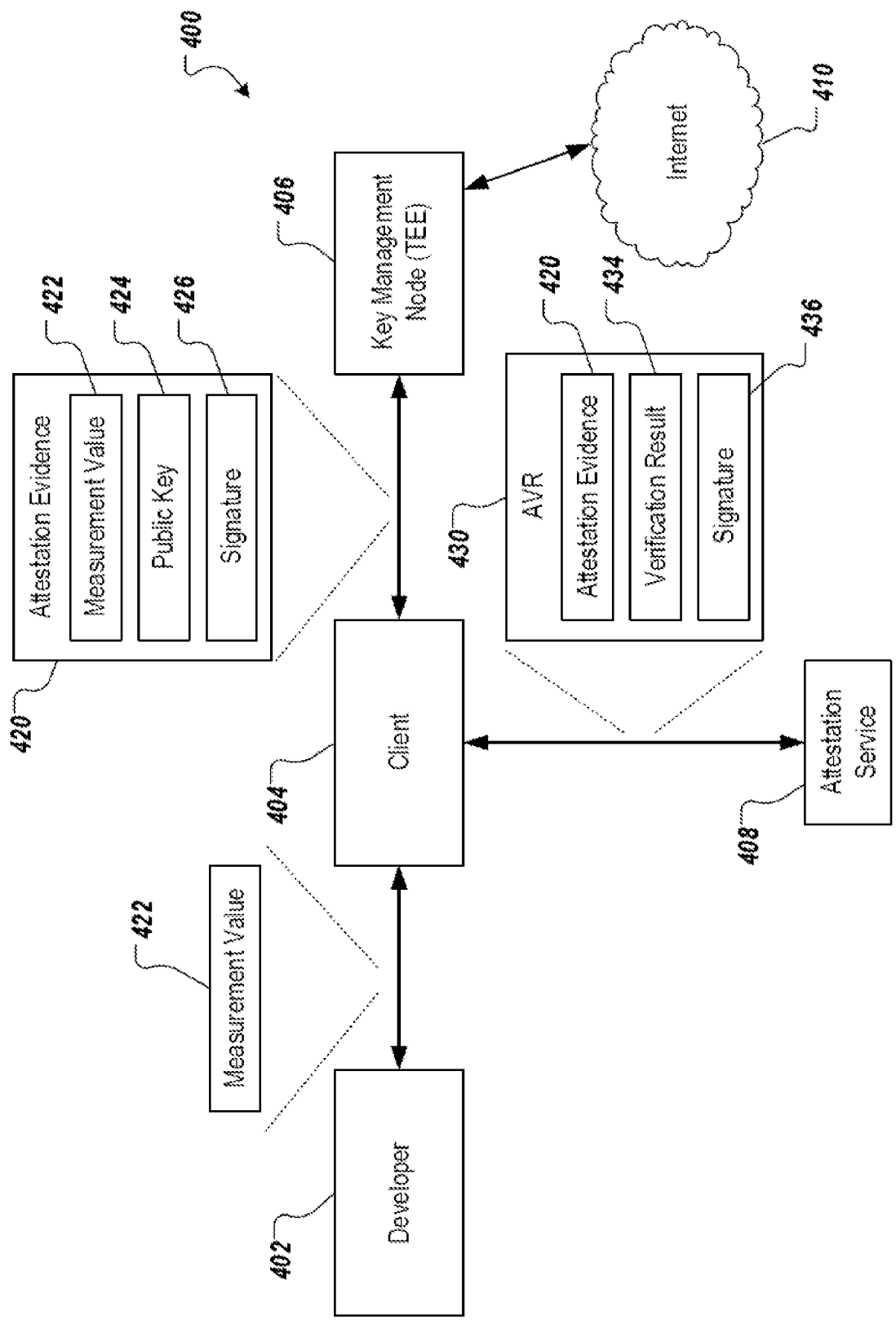
FIG. 4 is a diagram illustrating an example of a system in accordance with embodiments of this specification.

FIG. 4 is a diagram illustrating an example of a system 400 in accordance with embodiments of this specification. As shown, the system 400 includes a developer 402 (e.g., a developer server), a client 404 (e.g., a client computing device), a key management node 406, an attestation service 408, and a network 410 (e.g., Internet). The client 404, the key management node 406, and the internet 410 can be the same components as the client 314, the key management node 310, and the network 312 as depicted in FIG. 3, respectively. A client 404 can challenge the key management node 406 for an attestation evidence 420, which can be verified by the attestation service 408 for determining a legitimacy of the key management node 406. An example of an attestation service 408 includes IAS, described above.

The developer 402 can be any suitable server, computer, module, or computing element programmed to perform the methods as described herein. In some examples, the developer 402 can store and process programs, data, or both that are related to the key management node 406. For example, the developer 402 can store a source code and a measurement value (e.g., a digest of an initial state) of the key management node 406. The developer 402 can send the measurement value of the key management node 406 to the client 404 upon request.

The client 404 can send a request (challenge) to the key management node 406 for an attestation evidence 420 that indicates a legitimacy of the key management node 406. In some examples, the attestation evidence 420 is used to determine whether the key management node 406 is a legitimate TEE node. The client 404 can provide the attestation evidence 420 to the attestation service 408 and receive an attestation verification report (AVR) 430 from the attestation service 408. In some embodiments, the client 404 verifies the AVR 430 to determine whether the attestation evidence 420 is valid. In some examples, the client 404 obtains a measurement value 422 from the key management node 406 and compares it with another measurement value 422 that is obtained from the developer 402. If the verification of the AVR 430 is successful and the two measurement values 422 match, the client 404 can determine that the key management node 406 is a legitimate TEE node and therefore is trustworthy.

The key management node 406 can generate the attestation evidence 420 upon request from the client 404. In some embodiments, the key management node 406 is provisioned with a service public key 424 and a service private key, which can be used by the client 404 for authentication and encryption of future communication. In some embodiments, the key management node 406 is further provisioned with an attestation private key, e.g., an Enhanced Privacy ID (EPID) private key, for signing the attestation evidence 420. The attestation evidence 420 signed using the EPID private key can be verified by the attestation service 408 using an EPID public key. EPID is an algorithm provided by Intel for attestation of a trusted system, while preserving privacy. In general, each of the members (e.g., a computer or a server) of a network is assigned an EPID private key for signing the attestation evidence, and a verifier of the attestation evidence in the network stores an EPID public key that is paired with the EPID private keys of the other members of the network. Each of the members can generate a signature of the attestation evidence using its own EPID private key, and the verifier can verify the signatures of the other members using the EPID public key. As such, the EPID keys can be used to prove that a device, such as a computer or a server, is a genuine device.

In some examples, the attestation evidence 420 indicates a legitimacy of key management node 406 (e.g., whether the key management node 406 is a trustworthy entity) and includes a measurement value 422 (e.g., a digest), a service public key 424, and a digital signature 426 of the key management node 406. The measurement value 422 may include a digest (e.g., a hash value) of an initial state of the key management node 406. The service public key 424 can be generated randomly using a predetermined key generation algorithm (e.g., Rivest-Shamir-Adleman (RSA)) by the key management node 406 along with a service private key. The signature 426 is generated based on the measurement value 422 and the service public key 424 using an attestation private key (e.g., an EPID private key) of the key management node 406.

The attestation service 408 can be implemented on any suitable server, computer, module, or computing element for verifying the validity of the attestation evidence 420. As noted above, the attestation evidence 420 includes the measurement value 422, the service public key 424, and the signature 426 of the key management node 406. Upon receiving the attestation evidence 420, the attestation service 408 can verify the signature 426 and generate an AVR 430.

In some examples, the attestation service 408 can verify the signature 426 in the attestation evidence 420 using an attestation public key (e.g., an EPID public key). After verifying the signature 426, the attestation service 408 can generate the AVR 430 that includes the attestation evidence 420, a verification result 434 indicating whether the signature 426 in the attestation evidence 420 is valid, and a signature 436 of the attestation service 408.

In some embodiments, the AVR 430 includes the attestation evidence 420 excluding the signature 426 of the key management node 406. For example, the AVR 430 may include the measurement value 422 of the key management node 406, the service public key 424, the verification result 434, and the signature 436. In some examples, the signature 436 is generated based on the attestation evidence 420 and the verification result 434 using a report signing key (e.g., a private key).

In operation, the client 404 obtains a measurement value 422 of the key management node 406 from the developer 402. The client 404 queries (challenges) the key management node 406, receives the attestation evidence 420, and sends the attestation evidence 420 to the attestation service 408. The attestation service 408 verifies the attestation evidence 420 and sends an AVR 430 to the client 404. The client 404 verifies the AVR 430 based on the signature 436 and the measurement value 422 in the AVR 430. Upon successfully verifying the AVR 430, the client 404 determines that the key management node 406 is a trustworthy entity and registers (e.g., stores) the service public key 424 of the key management node 406. The verification of the attestation evidence 420 and AVR 430 will be discussed below in additional detail with reference to FIG. 5.

Figure 5:
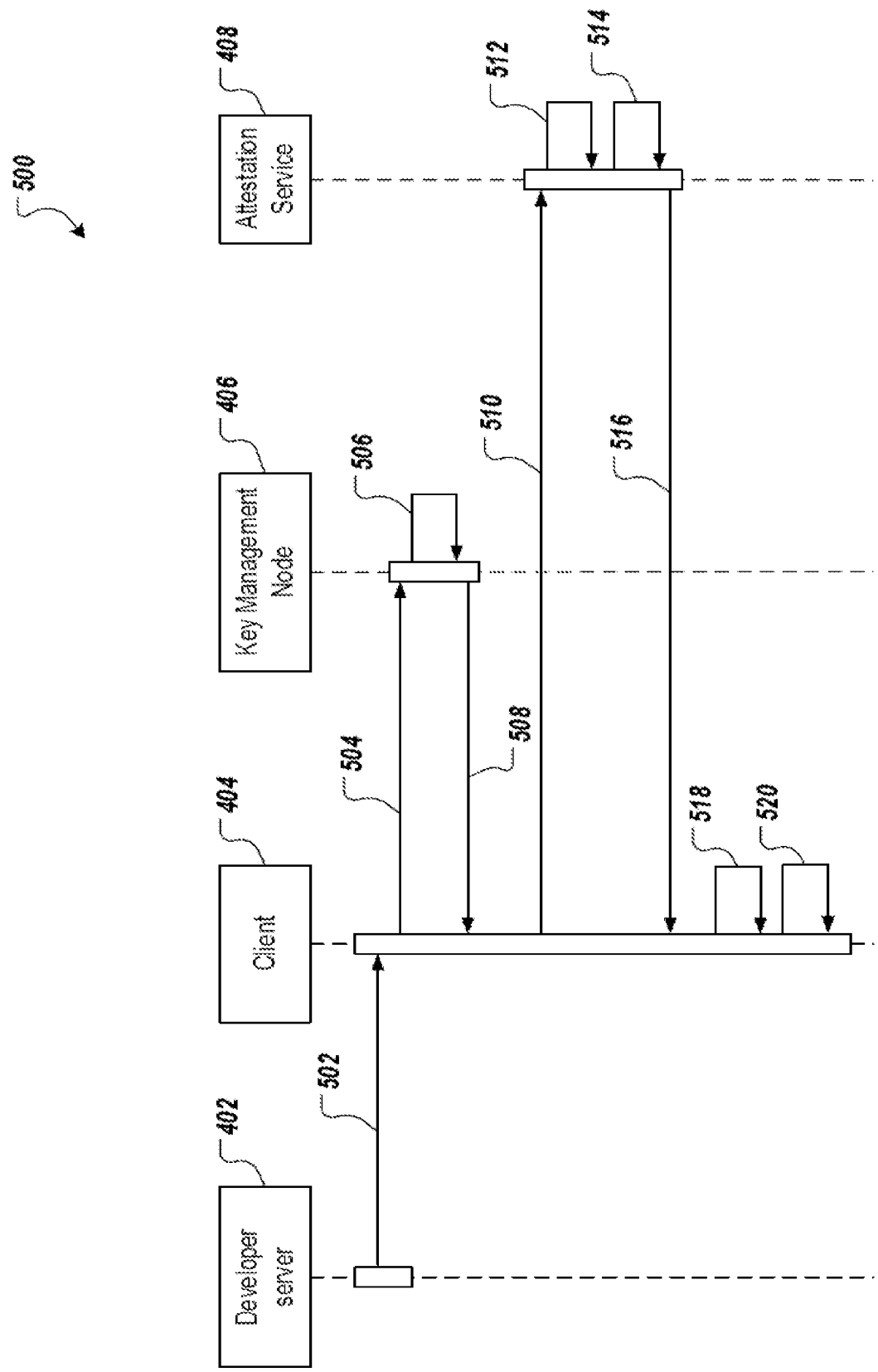
FIG. 5 depicts an example of a signal flow in accordance with embodiments of this specification.

FIG. 5 depicts an example of a signal flow 500 in accordance with embodiments of this specification. The signal flow 500 represents an attestation verification process of a key management node (e.g., key management node 406). For convenience, the process will be described as being performed by a system of one or more computers, located in one or more locations, and programmed appropriately in accordance with this specification. For example, a distributed system (the system 400 of FIG. 4), appropriately programmed, can perform the process.

In the example of FIG. 5, the developer 402 sends (502) a measurement value 422 of the key management node 406 to the client 404 upon a request from the client 404. For example, the client 404 may send a request to the developer server 402 for the measurement value 422 of key management node 406. Upon verifying an identity of the client 404, the developer server 402 can send the requested measurement value 422 to the client 404. The client 404 stores the measurement value 422 of the key management node 406 for future use.

The client 404 sends (504) an attestation request (e.g., a challenge) to the key management node 406. The attestation request is sent to the key management node 406 to request an attestation evidence 420 that can be used to determine a legitimacy of the key management node 406.

In response to the attestation request, the key management node 406 generates (506) the attestation evidence 420. In some examples, the attestation evidence 420 includes a measurement value 422, a service public key 424, and a digital signature 426 of the key management node 406. In some embodiments, the measurement value 422 can include a digest of an initial state of the key management node 406. For example, the measurement value 422 may include a hash value of a process code that is implemented on the key management node 406. The service public key 424 can be generated randomly by the key management node 406 along with a service private key using a predetermined key generation algorithm (e.g., RSA). The signature 426 can be generated based on the measurement value 422 and the service public key 424 using an attestation private key (e.g., an EPID private key) of the key management node 406.

The key management node 406 sends (508) the attestation evidence 420 to the client 404 in response to the attestation request. The client 404 forwards (510) the attestation evidence 420 to the attestation service 408. In some embodiments, the client 404 sends an attestation verification request to the attestation service 408. The attestation verification request can include the attestation evidence 420 of the key management node 406, and some supplemental information, such as, for example, a descriptor that indicates whether the key management node 406 uses the SGX platform service.

The attestation service 408 verifies (512) the attestation evidence 420 in response to receiving the attestation evidence 420 from the client 404. As noted, the attestation evidence 420 includes the measurement value 422, the service public key 424, and the signature 426 of the key management node 406. As noted, the signature 426 can be generated based on the measurement value 422 and the service public key 424 using an attestation private key (e.g., an EPID private key) of the key management node 406. In some examples, the attestation service 408 is provisioned with an attestation public key (e.g., EPID public key) that can be used to verify the signature 426 in the attestation evidence 420.

If the attestation service 408 determines that the signature 426 in the attestation evidence 420 is valid, the attestation service 408 can determine that the key management node 406 is a trustworthy entity. If the attestation service 408 determines that the signature 426 is invalid, the attestation service 408 can determine that the key management node 406 is not a trustworthy entity, and can flag an error and reject any subsequent data and requests from the key management node 406.

The attestation service 408 generates (514) an AVR 430 based on a verification of the attestation evidence 420. In some embodiments, the AVR 430 can include the attestation evidence 420, an attestation verification result 434, and a digital signature 436 of the attestation service 408. In some embodiments, the AVR 430 may include the attestation evidence 420 excluding the signature 426 of the key management node 406. For example, the AVR 430 may include the measurement value 422, the service public key 424, the attestation verification result 434, and the signature 436 of the attestation service 408.

The attestation verification result 434 in the AVR 430 indicates whether the signature 426 in the attestation evidence 420 is valid. For example, the attestation verification result 430 may include a value of "valid," or "OK" that indicates the signature 426 in the attestation evidence 420 is valid or a value of "invalid" that indicates the signature 426 is invalid.

In some embodiments, the signature 436 in AVR 430 is generated based on the attestation evidence 420 and the attestation verification result 434 using a report signing key. The report signing key can be a private key that the attestation service 408 uses to sign the AVR 430. In some examples, the report signing key is generated by the attestation service 408 using a predetermined key generated algorithm. For example, the report signing key may be generated using the RSA-Secure Hash Algorithm (SHA) 256.

The attestation service 408 sends (516) the AVR 430 to the client 404. In some embodiments, the client 404 verifies (518) the AVR 430 upon receiving the AVR 430. In some examples, the client 404 can verify the signature 436 in the AVR 430 using a report signing certificate. The report signing certificate may be an X.509 digital certificate. If the client 404 verifies that the signature 436 in the AVR 430 is valid, the client 404 can determine that the AVR 430 is indeed sent by the attestation service 408. If the client 404 determines that the signature 436 in the AVR 430 is invalid, the client 404 can determine that the AVR 430 is not genuine, and can reject the AVR 430. The client 404 may further inspect the attestation verification result 434 in the AVR 430 to determine whether the attestation evidence 420 is successfully verified by the attestation service 408.

In some embodiments, the client 404 compares the measurement value 422 in the attestation evidence 420 in the AVR 430 with a measurement value 422 that is previously obtained from the developer 402 to determine whether the attestation evidence 420 is valid.

The client 404 registers (520) the key management node 406 as a trustworthy entity in response to determining that the AVR 430 is genuine. For example, the client 404 can deem the key management node 406 to be trustworthy if the measurement value 422 in AVR 430 matches the measurement value 422 previously obtained from the developer server 402, the verification result 434 indicates the signature 426 is valid, signature 436 is verified to be valid, or a combination thereof. The client 404 may further store the service public key 424 that is included in the attestation evidence 420 in the AVR 430.

Figure 6:
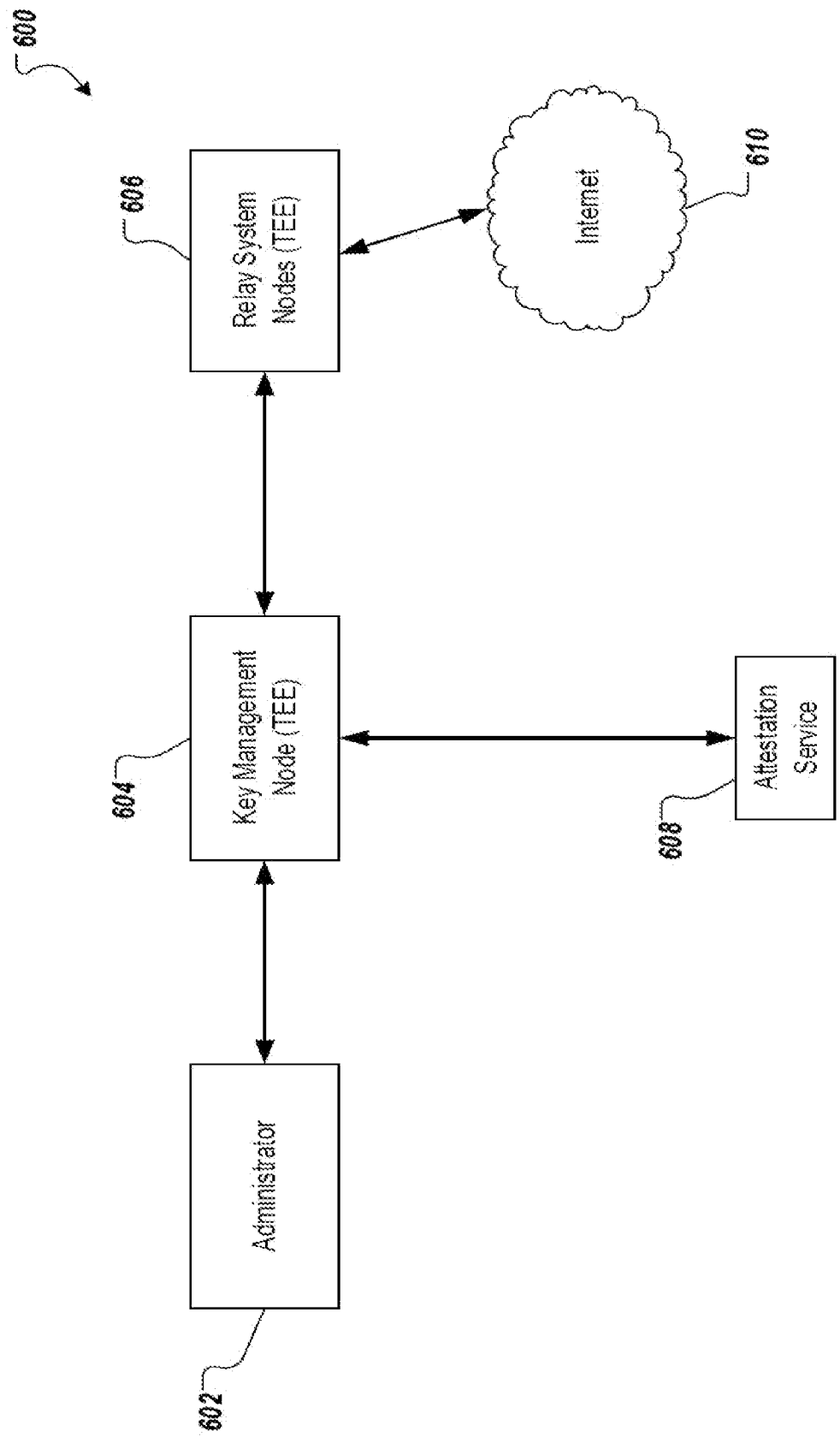
FIG. 6 is a diagram illustrating an example of a system in accordance with embodiments of this specification.

FIG. 6 is a diagram illustrating an example of a system 600 in accordance with embodiments of this specification. As shown, the system 600 includes an administrator 602 (e.g., an administrating computing device), a key management node 604, a plurality of relay system nodes 606, an attestation service 608, and a network 610 (e.g., Internet). In general, the key management node 604 challenges each of the relay system nodes 606 for an attestation evidence of the relay system node 606, which can be verified by the attestation service 608 for a legitimacy of the relay system node 606. Upon successfully verifying the relay system nodes 606, the key management node 604 can send a signing key (e.g., a service private key) to each of the relay system nodes 606 such that all relay system nodes 606 share the same signing key.

The administrator 602 can be implemented on any suitable server, computer, module, or computing element for performing the algorithm as discussed herein. In some examples, the administrator 602 queries the key management node 604 for verifying the relay system nodes 606. In some examples, the administrator 602 sends a request to the key management node 604 that includes a network address (e.g., URL) of the relay system node 606 to be verified.

The key management node 604 can challenge the relay system nodes 606 for the attestation evidence and send the attestation evidence to the attestation service 608 to verify whether the attestation evidence is valid. In some examples, the key management node 604 receives a request from the administrator 602 that includes a URL of a relay system node 606 to be verified. The key management node 604 can query the relay system node 604 for the attestation evidence using the URL of the relay system node 606. In some examples, the key management node 604 receives an attestation evidence from the relay system node 606 that includes a measurement value, a public key, and a signature of the relay system node 606. The key management node 604 can send the attestation evidence of the relay system node 606 to the attestation service 608 to verify whether the attestation evidence is valid. The key management node 604 can receive an AVR from the attestation service 608 that includes the attestation evidence, an attestation verification result of the attestation evidence, and a signature of the attestation service 608. The key management node 604 can verify the AVR based on the measurement value in the attestation evidence, the verification result, and the signature of the attestation service 608. For example, the key management node 604 can compare the measurement value of the relay system node 606 in the attestation evidence in the AVR to another measurement value that is pre-stored in the key management node 604 to see if they match. The key management value 604 can inspect the attestation verification result to see whether the attestation evidence has been successfully verified by the attestation service 608. The key management value 604 can verify the signature of the attestation service 608 to determine whether the AVR is indeed sent by the attestation service 608. In some examples, if the key management node 604 determines that the measurement value of the relay system node 606 in the attestation evidence in the AVR matches another measurement value that is pre-stored in the key management node 604, and the attestation verification result indicates that the attestation evidence is valid, the signature of the attestation service 608 is valid, or a combination thereof, the key management node 604 can determine that the AVR is valid.

The key management node 604 can obtain and store a public key of the relay system node 606 that is included in the attestation evidence in the AVR upon verifying that the AVR is valid. The key management node 604 can further use the public key of the relay system node 606 to encrypt its service private key and send the encrypted service private key to the relay system node 606. In some examples where the key management node 604 distributes its service private key to a plurality of relay system nodes 606, the key management node 604 can use each relay system node's respective public key to encrypt its service private key.

The relay system nodes 606 can decrypt the encrypted service private key from the key management node 604 and obtain the service private key of the key management node 604. For example, each relay system node 606 can use its respective private key to obtain the service private key that is encrypted using the public key of the relay system node 606. The relay system nodes 606 store the service private key of the key management node 604 for future use. As noted, the plurality of relay system nodes 606 share the same service private key of the key management node 604.

The attestation service 608 can verify whether the attestation evidence of the relay system nodes 606 is valid. As noted, the attestation evidence of the relay system node 606 includes a measurement value, a public key, and a signature of the relay system node 606. In some examples, the signature of the relay system node 606 is generated using an attestation private key (e.g., EPID private key) of the relay system node 606. The attestation service 608 can verify the signature of the relay system node 606 using an attestation public key (e.g., EPID public key) and determine whether the attestation evidence is valid based on the verification of the signature. Upon verifying the attestation evidence, the attestation service 608 can send an AVR to the key management node 604. As noted, the AVR can include the attestation evidence, an attestation verification result of the attestation evidence, and a signature of the attestation service 608.

In operation, the administrator 602 sends a network address of the relay system node 606 to be verified to the key management node 604. The key management node 604 initiates a remote attestation request to the relay system node 606 using the network address. The relay system node 606 generates a pair of secret keys randomly that includes a public key and a private key, and includes the public key in an attestation evidence that is returned to the key management node 604. The key management node 604 submits the attestation evidence of the relay system node 606 to the attestation service 608 for verifying a validity of the attestation evidence. The attestation service 608 verifies the attestation evidence from the key management node 604 and returns an AVR. The key management node 604 verifies the AVR to determine whether the relay system node 606 is a legitimate TEE node. In some examples, the key management node 604 determines whether a measurement value included in the attestation evidence in the AVR is consistent with an expected measurement value. Upon successfully verifying the AVR, the key management node 604 encrypts its service private key using the public key of the relay system node 606 that is included in the attestation evidence. The key management node 604 sends the encrypted service private key to the relay system node 606. Upon receiving the encrypted service private key from the key management node, the relay system node 606 obtains the service private key using its private key. As such, the key management node 604 can distribute its service private key to the relay system nodes 606 that have been verified to be legitimate. The distribution of the service private key will be discussed below in greater detail with reference to FIG. 7.

Figure 7:
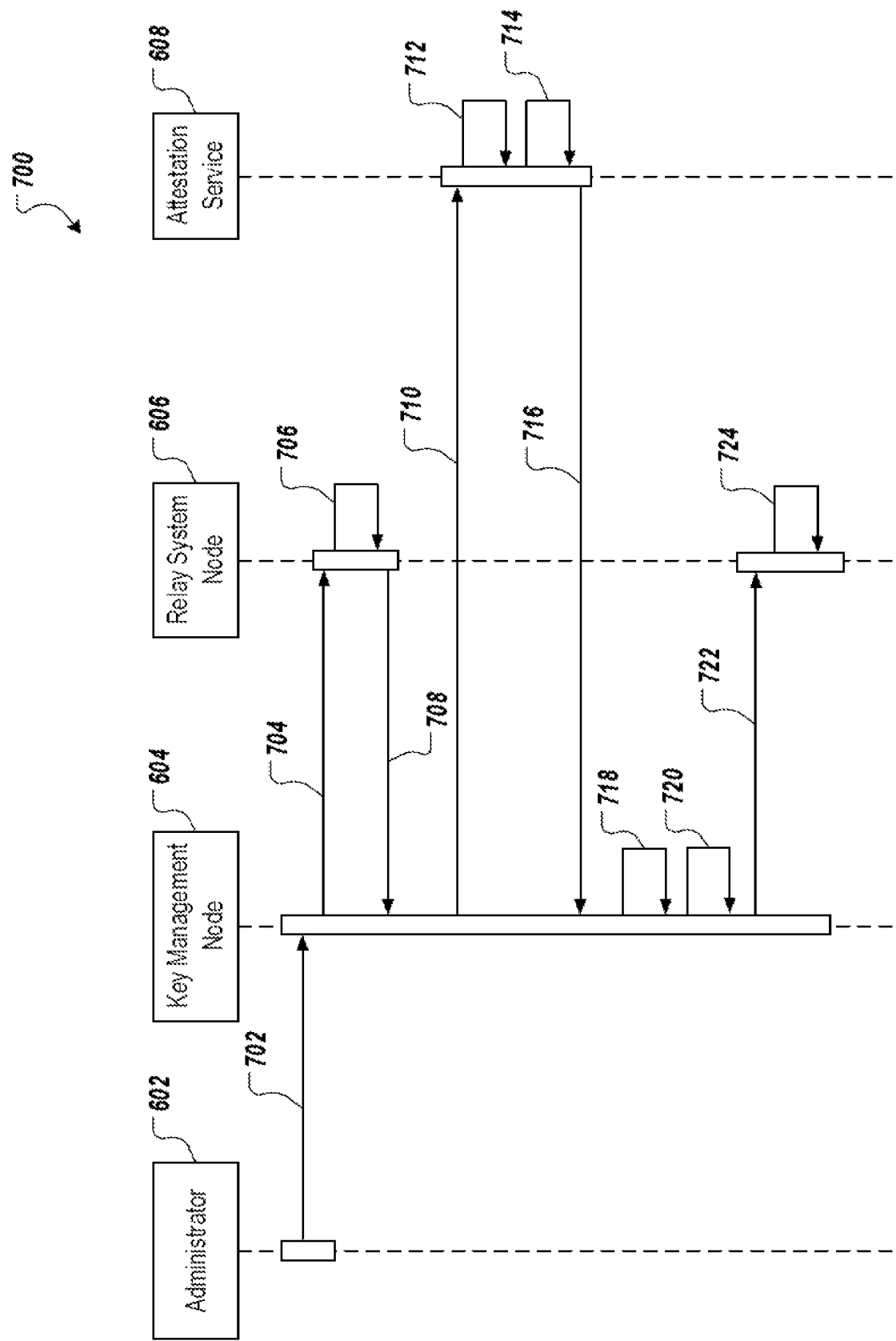
FIG. 7 depicts an example of a signal flow in accordance with embodiments of this specification.

FIG. 7 depicts an example of a signal flow 700 in accordance with embodiments of this specification. The signal flow 700 represents a signing key (e.g., a service private key) distribution process. For convenience, the process will be described as being performed by a system of one or more computers, located in one or more locations, and programmed appropriately in accordance with this specification. For example, a distributed system (the system 600 of FIG. 6), appropriately programmed, can perform the process.

In the example of FIG. 7, the administrator 602 sends (702) a request to the key management node 604 for determining whether a relay system node 606 is a legitimate TEE node. In some examples, the request includes a network address (e.g., URL) of the relay system node 606 to be verified.

The key management node 604 sends (704) a remote attestation request to the relay system node 606 using the network address. In some examples, the remote attestation request is sent to the relay system node 606 for an attestation evidence that indicates a legitimacy of the relay system node 606. The attestation evidence can include a measurement value (e.g., a hash value of an initial state), a public key, and a signature of the relay system node 606 to be verified.

In response to the attestation request, the relay system node 606 generates (706) an attestation evidence. As noted, the attestation evidence includes a measurement value, a public key, and a digital signature of the relay system node 606. In some embodiments, the measurement value can include a digest of an initial state of the relay system node 606. For example, the measurement value may include a hash value of a process code that is implemented on the relay system node 606. The public key can be generated randomly by the relay system node 606 along with a private key using a predetermined key generation algorithm (e.g., RSA). The signature be generated based on the measurement value and the public key using an attestation private key (e.g., an EPID private key) of the relay system node 606.

The relay system node 606 sends (708) the attestation evidence to the key management node 604 in response to the attestation request. The key management node 604 forwards (710) the attestation evidence to the attestation service 608. In some embodiments, the key management node 604 sends an attestation verification request to the attestation service 608. The attestation verification request can include the attestation evidence of the relay system node 606, and some supplemental information, such as, for example, a descriptor that indicates whether the relay system node 606 uses the SGX platform service.

The attestation service 608 verifies (712) the attestation evidence. As noted, the attestation evidence includes a measurement value, a public key, and a signature of the relay system node 606. The signature is generated based on the measurement value and the public key using an attestation private key (EPID private key) of the relay system node 606. In some examples, the attestation service 608 is provisioned with an attestation public key (EPID public key) that can be used to verify the signature in the attestation evidence.

If the attestation service 608 determines that the signature in the attestation evidence is valid, the attestation service 608 can determine that the relay system node 606 is a trustworthy entity. If the attestation service 608 determines that the signature is invalid, the attestation service 608 can determine that the relay system node 606 is not a trustworthy entity, and can flag an error and reject any subsequent data and requests from the relay system node 606.

The attestation service 608 generates (714) an AVR based on a verification of the attestation evidence. In some embodiments, the AVR can include the attestation evidence, an attestation verification result, and a digital signature of the attestation service 608. In some embodiments, the AVR may include the attestation evidence excluding the signature of the relay system node 606. In some examples, the signature of the AVR is generated based on the attestation evidence and the attestation verification result using a report signing key (a private key).

The attestation service 608 sends (716) the AVR to the key management node 604. In some embodiments, the key management node 604 verifies (718) the AVR from the attestation service 608. In some examples, the key management node 604 verifies the signature of the AVR using a report signing certificate (a public key). In some embodiments, the key management node 604 compares the measurement value in the attestation evidence with another measurement value that is pre-stored in the key management node 604 to determine whether the attestation evidence is valid. Upon successfully verifying the AVR and the measurement value, the key management node 604 stores the public key of the relay system node 606.

The key management node 604 encrypts (720) its service private key using the public key of the relay system node 606 and sends (722) the encrypted service private key to the relay system node 606.

Upon receiving the encrypted service private key from the key management node 604, the relay system node 606 obtains (724) the service private key of the key management node using its private key. The relay system node 606 can store the service private key for future use.

Figure 8:
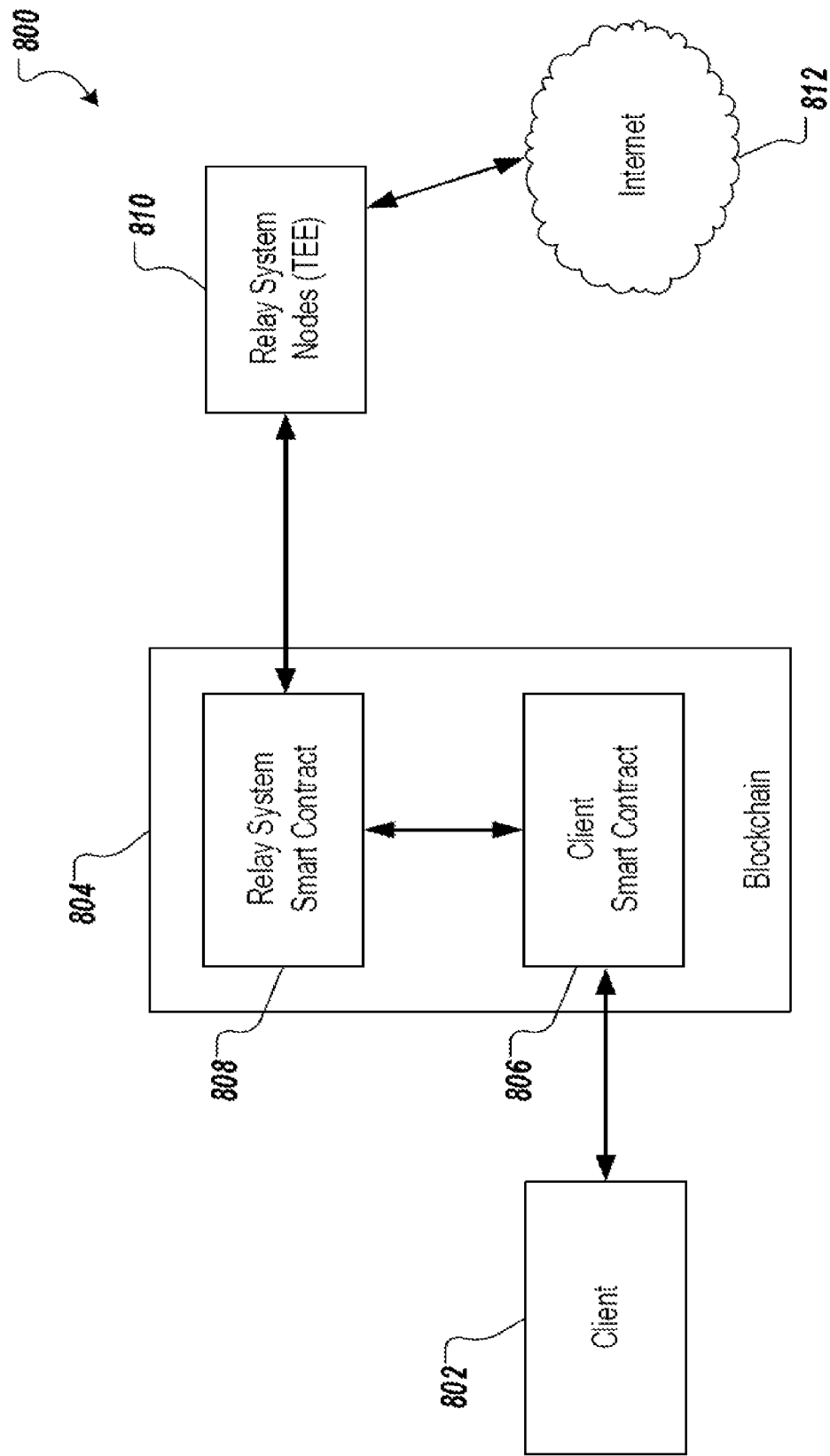
FIG. 8 is a diagram illustrating an example of a system in accordance with embodiments of this specification.

FIG. 8 is a diagram illustrating an example of a system 800 in accordance with embodiments of this specification. As shown, system 800 includes a client 802 (e.g., a client computing device), a blockchain 804, a plurality of relay system nodes 810 forming a multi-node cluster, and a network 812 (e.g., Internet). In the depicted example, the blockchain 804 includes a client smart contract 806 and a relay system smart contract 808. In some embodiments, the relay system nodes 810 are implemented using a TEE technology (e.g., Intel SGX).

In general, the client 802 requests data from a data source in the network 812 and receives retrieved data from the data source through the blockchain 804 and the relay system nodes 810 such that the integrity of the request and retrieved data can be verified.

In operation, the client 802 constructs a request that includes a plaintext portion and a confidential data portion, where the confidential data portion is encrypted by the client 802 using a service public key that is previously obtained from a key management node (e.g., key management node 406 and 604). The client 802 submits the request to the client smart contract 806 within blockchain 804. The client smart contract 806 forwards the request to the relay system smart contract 808. The relay system smart contract 806 forwards the request to a relay system node 810 in the multi-node cluster. In some examples, the relay system smart contract 808 randomly selects a relay system node 810 that is available. In some examples, the relay system smart contract 808 sends the request through a log message. The relay system node 810 receives the request and obtains the confidential data portion using a service private key that is previously obtained from the key management node. The relay system node 810 combines the plaintext portion and the confidential data portion into a data request. The relay system node 810 then submits the data request to the Internet data source 812. The relay system node 810 receives a request result from the Internet data source 812 and signs the request result using the service private key. The relay system node 810 submits the signed request result to the relay system smart contract 808, which is further forwarded to the client 802 through the client smart contract 806. The client 802 receives the signed request result and verifies the signed request result using the service public key. Upon successfully verifying the signed request result, the client 802 can use the result.

Figure 9:
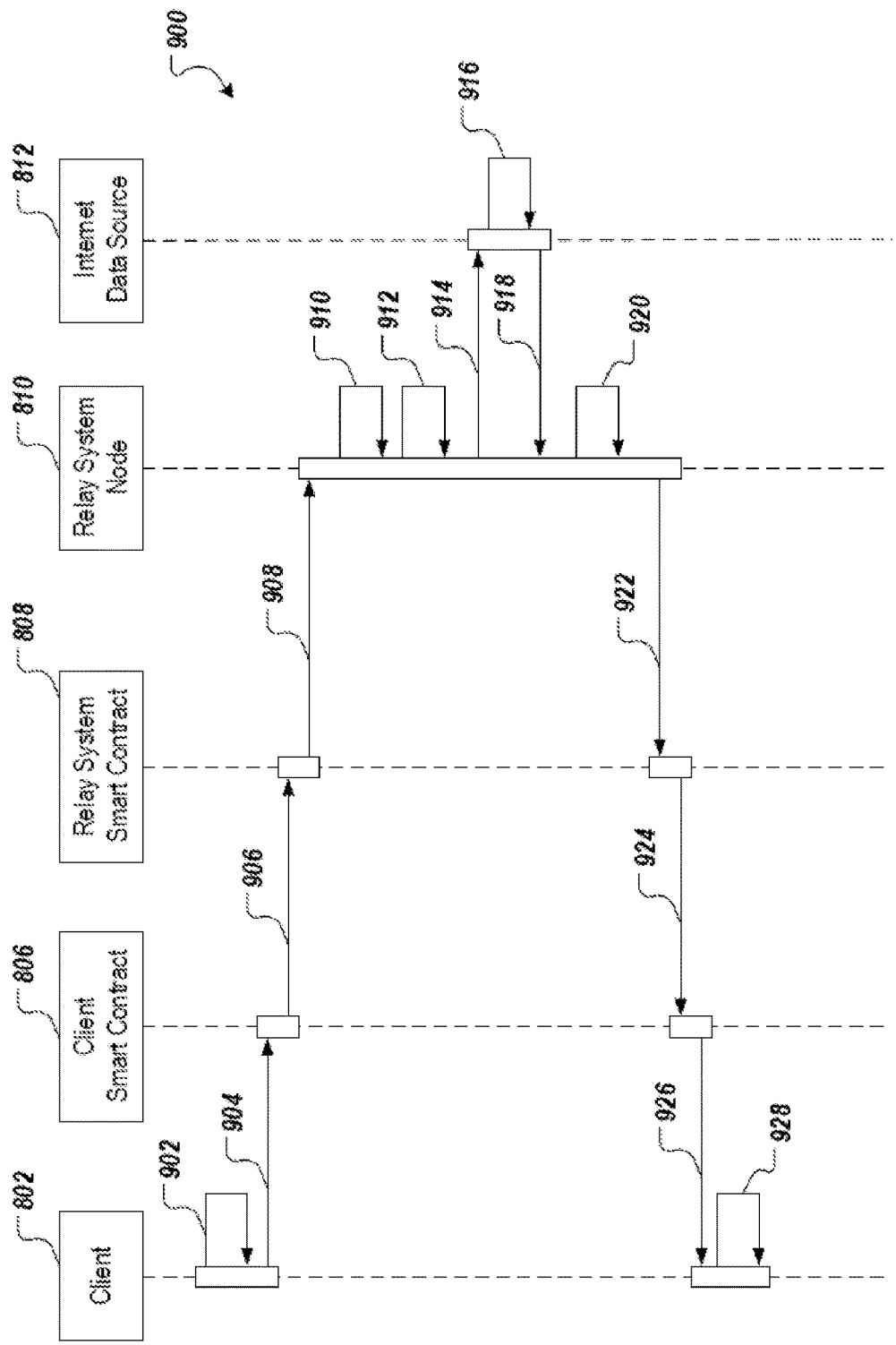
FIG. 9 depicts an example of a signal flow in accordance with embodiments of this specification.

FIG. 9 depicts an example of a signal flow 900 in accordance with embodiments of this specification. For convenience, the process 900 will be described as being performed by a system of one or more computers, located in one or more locations, and programmed appropriately in accordance with this specification. For example, a distributed system (e.g., the blockchain system 100 of FIG. 1 and the system 800 of FIG. 8), appropriately programmed, can perform the process 900.

The client 802 generates (902) a request for data or service from the Internet-based data source 812. In some examples, the request may be an access request for an account of the client 802. The access request may include a plaintext portion, such as, for example, a web address, and a confidential data portion, such as, for example, credentials (e.g., a user name, a password) of the client account. In some examples, the confidential data portion in the access request can be encrypted, such that malicious actors over the network cannot obtain the personal information of the user account to infiltrate the user account. In some examples, the confidential data portion is encrypted by the client 802 using a service public key that is obtained from a key management node during an earlier attestation process.

The client 802 sends (904) the request to the client smart contract 806. The client smart contract 806 forwards (906) the request to the relay system smart contract 808.

The relay system smart contract 808 forwards (908) the request to the relay system node 810. In some embodiments, the relay system smart contract 808 periodically receives, from a key management node, a list of the relay system nodes 810 in a multi-node cluster that have been verified to be legitimate during an earlier key distribution process. The relay system smart contract 808 can randomly select a verified relay system node 810, or can select a verified relay system node 810 having the least workload from the list. In some examples, the relay system smart contract 808 sends the request to the selected relay system node 810 through a log message.

In some embodiments, the relay system node 810 obtains (910) the confidential data portion from the request using a service private key that is obtained during an earlier key distribution process. For example, the relay system node 810 can decrypt the encrypted confidential data portion using the service private key. As noted, the relay system nodes 810 in the multi-node cluster obtain and share the same service private key. Each of the verified relay system nodes 810 can use the same service private key to process the encrypted confidential data portion.

The relay system node 810 combines (912) the plaintext portion and the confidential data portion into a data request. The new data request can be used by the relay system node 810 to query the Internet data source 812. For example, the new data request may include a plaintext portion including a web address where the client 802 wants to access an account, and a confidential data portion including credentials (e.g., user name and password) to login to the account.

The relay system node 810 submits (914) the data request to the Internet data source 812. The Internet data source 812 processes (916) the data request and returns (918) a request result to the relay system node 810.

The relay system node 810 processes (920) the request result to provide a response. In accordance with embodiments of this specification, the relay system node 810 signs the result using its service private key to provide the response. In further detail, the result, or at least a portion of the result (e.g., the data) is processed by the relay system node 810 through a hash function to provide a hash value. An example of a hash function includes, without limitation, SHA-256. The relay system node 810 generates a digital signature based on the hash value and the service private key. For example, the hash value and the service private key are processed through a signature algorithm, which provides the digital signature. The relay system node 810 provides the response, which includes the results (e.g., the data) and the digital signature. The relay system node 810 sends (922) the response to the relay system smart contract 808.

The relay system smart contract 808 forwards (924) the response to the client smart contract 806. The client smart contract 806 provides (926) the response to the client 802.

In some embodiments, the client 802 verifies (928) the signed request result in the response. In some examples, the client 802 verifies the signature in the signed request result using its service public key. The client 802 processes the request result in the response using a hash function to compute a first hash value. Then, the client 802 process the signature of the request result using the service public key to obtain a second hash value included in the signature. Then, the client 802 compares the first hash value to the second hash value. If the two hash values match, the client 802 can determines that the request result and use the request result. If the two hash values do not match, the client 802 can determine that the request result is invalid and flag an error.

Figure 10:
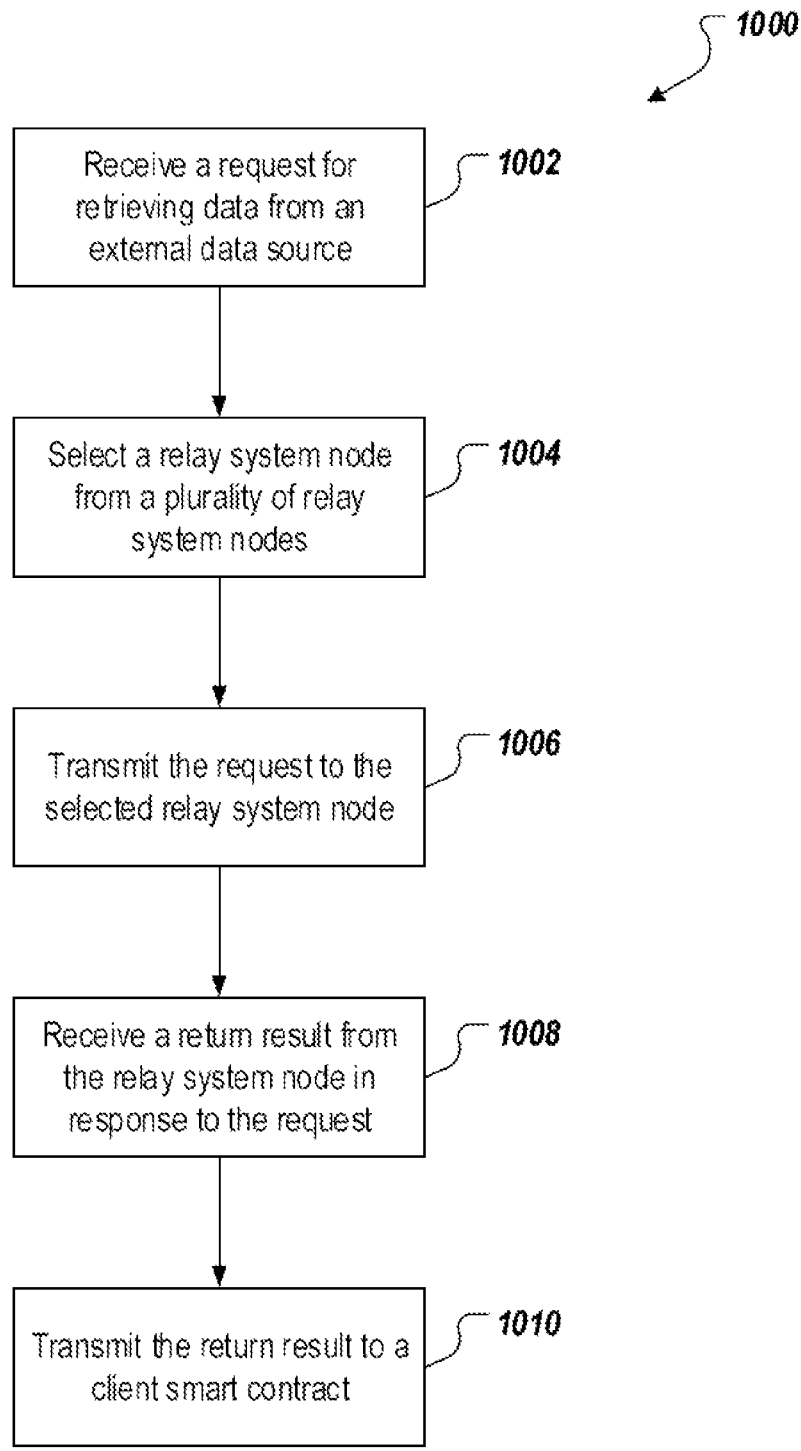
FIG. 10 depicts an example of a process in accordance with embodiments of this specification.

FIG. 10 is a flowchart of an example of a process 1000 for retrieving data from an external data source that is external to a blockchain network. For convenience, the process 1000 will be described as being performed by a system of one or more computers, located in one or more locations, and programmed appropriately in accordance with this specification. For example, a distributed system, e.g., the distributed system 300 of FIG. 3, appropriately programmed, can perform the process 1000.

At 1002, a relay system smart contract executing within the blockchain network receives a request from a client smart contract for retrieving data from an external data source. In some embodiments, the request includes encrypted data. The encrypted data includes access data for accessing the external data source that is encrypted using a service public key of a key management node. In some embodiments, the key management node is located external to the blockchain network;

At 1004, the relay system smart contract selects a relay system node from a plurality of relay system nodes that are external to the blockchain network. In some embodiments, the plurality of relay system nodes are distributed with a service private key of the key management node.

At 1006, the relay system smart contract transmits the request to the selected relay system node.

At 1008, the relay system smart contract receives a return result from the selected relay system node in response to the request. In some embodiments, the return result includes the data retrieved from the external data source and obtained by the relay system node and a digital signature. In some embodiments, the digital signature is generated based on the data retrieved from the external data source and the service private key of the key management node.

At 1010, the relay system smart contract transmits the return result to the client smart contract.

Figure 11:
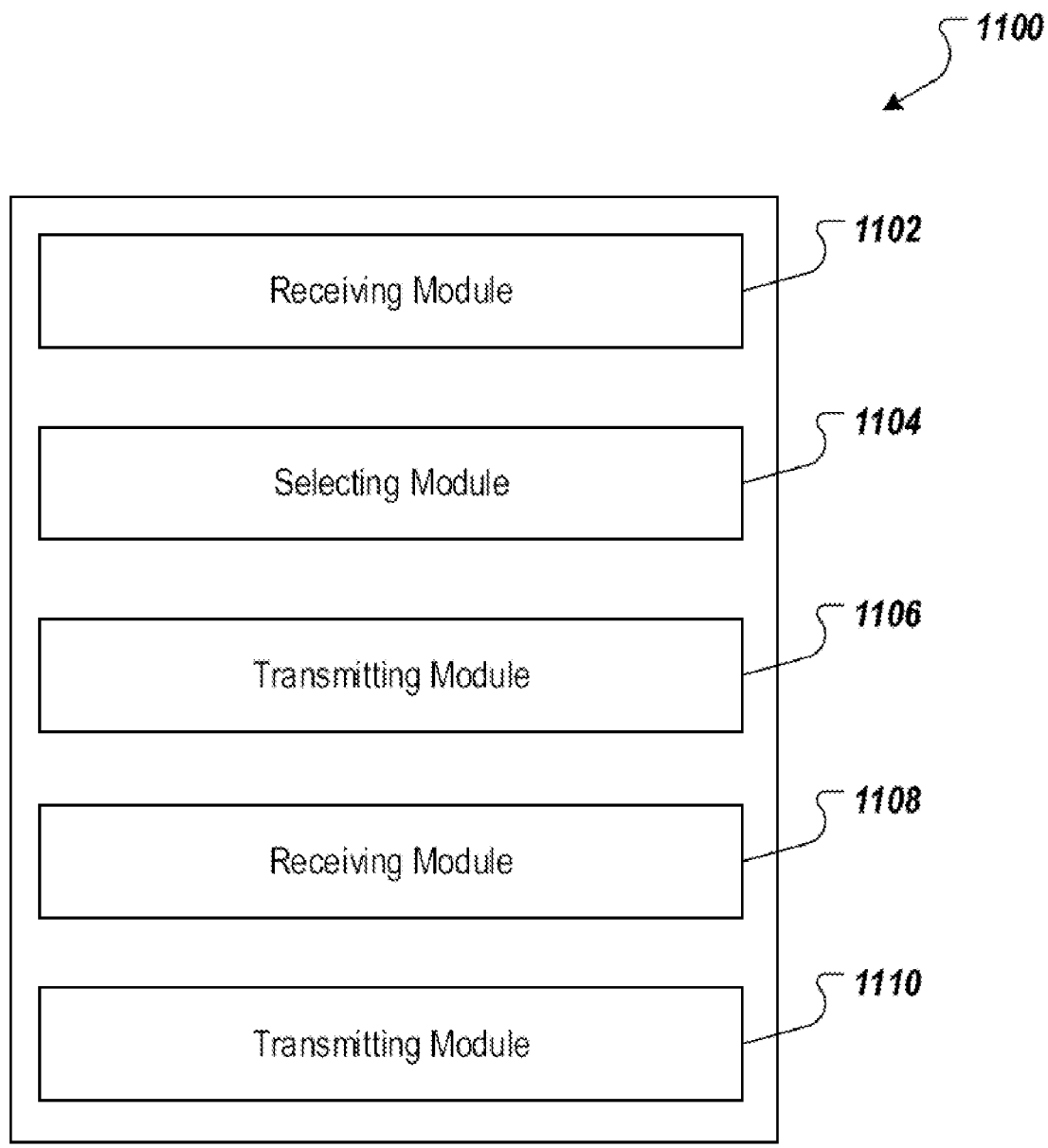
FIG. 11 depicts examples of modules of an apparatus in accordance with embodiments of this specification.

FIG. 11 is a diagram of an example of modules of an apparatus 1100 in accordance with embodiments of this specification. The apparatus 1100 can be an example of an embodiment of a blockchain network node configured to retrieve data from external data source, wherein a smart contract executes within the blockchain network node. The apparatus 1100 can correspond to the embodiments described above, and the apparatus 1100 includes the following: a receiving module 1102 that receives a request from a client smart contract for retrieving the data from the external data source, the request including encrypted data, the encrypted data including access data for accessing the external data source that is encrypted using a service public key of a key management node that is external to the blockchain network; a selecting module 1104 that selects a relay system node from a plurality of relay system nodes that are external to the blockchain network, wherein the plurality of relay system nodes are distributed with a service private key of the key management node; a transmitting module 1106 that transmits the request to the relay system node; a receiving module 1108 that receives a return result from the relay system node in response to the request, the return result including the data retrieved from the external data source obtained by the relay system node and a digital signature, wherein the digital signature is generated based on the data retrieved from the external data source and the service private key of the key management node; and a transmitting module 1110 that transmits the return result to the client smart contract.

In an optional embodiment, the service private key and the service public key of the key management node are provisioned by an attestation process of the key management node.

In an optional embodiment, the attestation process with the key management node and an attestation service is executed by a client device; and the service public key of the key management node is obtained by the client device during the attestation process.

In an optional embodiment, the return result is validated by the client device using the service public key of the key management node.

In an optional embodiment, the plurality of relay system nodes each execute a trusted execution environment (TEE).

In an optional embodiment, the request is decrypted by the first relay system node to obtain the access data using the service private key of the key management node.

In an optional embodiment, the attestation process with each of the plurality of relay system nodes and an attestation service is executed by the key management node.

In an optional embodiment, the key management node executes a key distribution process with the plurality of relay system nodes, the key distribution process resulting the service private key of the key management node being distributed to the plurality of relay system nodes.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 11, it can be interpreted as illustrating an internal functional module and a structure of a blockchain data retrieving apparatus. The blockchain data retrieving apparatus can be an example of a blockchain node executing a smart contract that is configured to retrieve data from external data source. An execution body in essence can be an electronic device, and the electronic device includes the following: one or more processors; and a memory configured to store an executable instruction of the one or more processors.

Embodiments of this specification achieve one or more technical effects over traditional systems. In some embodiments, a key management node for distributing a service private key to a plurality of relay system nodes is provided. As described herein, a remote attestation can be performed for the key management node, which eliminates the need for each client to independently perform remote attestation of the relay system nodes. This generally alleviates network bottlenecks caused by the individual attestation of the relay system nodes from each client. Furthermore, a relay system smart contract for selecting an available relay system node from a plurality of relay system nodes is provided. As described herein, with the relay system nodes being deployed in a cluster, the relay system smart contract can automatically assign a client request to an available relay system node in the cluster, avoiding service unavailability due to individual relay system node failure. As such, the embodiments of this specification improve the overall service availability of the relay system nodes for querying network data sources. In some embodiments, the relay system smart contract avoids there being a direct contact between the client and the relay system nodes, thereby avoiding exposing a position or access point of the relay system nodes. As such, the relay system nodes are less likely to be found and attacked by malicious actors over the network in many forms, such as, for example, DDoS attacks. This improves security of the relay system nodes, thereby further improving security of the communication between the clients and the relay system nodes.

Described embodiments of the subject matter can include one or more features, alone or in combination. For example, in a first embodiment, a method for retrieving data from external data source includes receiving, from a client smart contract and by a relay system smart contract executing within the blockchain network, a request for retrieving the data from the external data source, the request comprising encrypted data, the encrypted data comprising access data for accessing the external data source that is encrypted using a service public key of a key management node that is external to the blockchain network; selecting, by the relay system smart contract, a relay system node from a plurality of relay system nodes that are external to the blockchain network, wherein the plurality of relay system nodes are distributed with a service private key of the key management node; transmitting, by the relay system smart contract, the request to the relay system node; receiving, from the relay system node and by the relay system smart contract, a return result in response to the request, the return result comprising of the data retrieved from the external data source obtained by the relay system node and a digital signature, wherein the digital signature is generated based on the data retrieved from the external data source and the service private key of the key management node; and transmitting, by the relay system smart contract, the return result to the client smart contract.

The foregoing and other described embodiments can each, optionally, include one or more of the following features:

A first feature, combinable with any of the following features, specifies that the service private key and the service public key of the key management node are provisioned by an attestation process of the key management node.

A second feature, combinable with any of the previous or following features, specifies that the attestation process with the key management node and an attestation service is executed by a client device; and the service public key of the key management node is obtained by the client device during the attestation process.

A third feature, combinable with any of the previous or following features, specifies that the return result is validated by the client device using the service public key of the key management node.

A fourth feature, combinable with any of the previous or following features, specifies that the plurality of relay system nodes each execute a trusted execution environment (TEE).

A fifth feature, combinable with any of the previous or following features, specifies that the request is decrypted by the first relay system node to obtain the access data using the service private key of the key management node.

A sixth feature, combinable with any of the previous or following features, specifies that the attestation process with each of the plurality of relay system nodes and an attestation service is executed by the key management node.

A seventh feature, combinable with any of the previous or following features, specifies that the key management node executes a key distribution process with the plurality of relay system nodes, the key distribution process resulting the service private key of the key management node being distributed to the plurality of relay system nodes.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for retrieving data from an external data source that is external to a blockchain network, the method comprising:
   receiving, from a client smart contract and by a relay system smart contract executing within the blockchain network, a request for retrieving the data from the external data source, the request comprising encrypted data, the encrypted data comprising access data for accessing the external data source that is encrypted using a service public key of a key management node that is external to the blockchain network;
   selecting, by the relay system smart contract, a relay system node from a plurality of relay system nodes that are external to the blockchain network, wherein the plurality of relay system nodes are distributed with a service private key of the key management node;

executing, by the key management node, an attestation process with each of the plurality of relay system nodes and an attestation service, wherein the key management node executes a key distribution process with the plurality of relay system nodes, the key distribution process resulting the service private key of the key management node being distributed to the plurality of relay system nodes;

transmitting, by the relay system smart contract, the request to the relay system node;

receiving, from the relay system node and by the relay system smart contract, a return result in response to the request, the return result comprising the data retrieved from the external data source obtained by the relay system node and a digital signature, wherein the digital signature is generated based on the data retrieved from the external data source and the service private key of the key management node; and transmitting, by the relay system smart contract, the return result to the client smart contract.

2. The computer-implemented method of claim 1, further comprising:

provisioning, by an attestation process of the key management node, the service private key and the service public key of the key management node.

3. The computer-implemented method of claim 2, further comprising:

executing, by a client device, the attestation process with the key management node and an attestation service; and obtaining, by the client device, the service public key of the key management node during the attestation process.

4. The computer-implemented method of claim 3, wherein the return result is validated by the client device using the service public key of the key management node.

5. The computer-implemented method of claim 1, wherein the plurality of relay system nodes each execute a trusted execution environment (TEE).

6. The computer-implemented method of claim 1, wherein the request is decrypted by the relay system node to obtain the access data using the service private key of the key management node.

7. A non-transitory, computer-readable storage medium storing one or more instructions executable by a computer system to perform operations comprising:

receiving, from a client smart contract and by a relay system smart contract executing within a blockchain network, a request for retrieving data from an external data source, the request comprising encrypted data, the encrypted data comprising access data for accessing the external data source that is encrypted using a service public key of a key management node that is external to the blockchain network;

selecting, by the relay system smart contract, a relay system node from a plurality of relay system nodes that are external to the blockchain network, wherein the plurality of relay system nodes are distributed with a service private key of the key management node;

executing, by the key management node, an attestation process with each of the plurality of relay system nodes and an attestation service, wherein the key management node executes a key distribution process with the plurality of relay system nodes, the key distribution process resulting the service private key of the key management node being distributed to the plurality of relay system nodes;

transmitting, by the relay system smart contract, the request to the relay system node;

receiving, from the relay system node and by the relay system smart contract, a return result in response to the request, the return result comprising the data retrieved from the external data source obtained by the relay system node and a digital signature, wherein the digital signature is generated based on the data retrieved from the external data source and the service private key of the key management node; and transmitting, by the relay system smart contract, the return result to the client smart contract.

8. The non-transitory, computer-readable storage medium of claim 7 further comprising:

provisioning, by an attestation process of the key management node, the service private key and the service public key of the key management node.

9. The non-transitory, computer-readable storage medium of claim 8, further comprising:

executing, by a client device, the attestation process with the key management node and an attestation service; and obtaining, by the client device, the service public key of the key management node during the attestation process.

10. The non-transitory, computer-readable storage medium of claim 9, wherein the return result is validated by the client device using the service public key of the key management node.

11. The non-transitory, computer-readable storage medium of claim 7, wherein the plurality of relay system nodes each execute a trusted execution environment (TEE).

12. The non-transitory, computer-readable storage medium of claim 7, wherein the request is decrypted by the relay system node to obtain the access data using the service private key of the key management node.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from a client smart contract and by a relay system smart contract executing within a blockchain network, a request for retrieving data from an external data source, the request comprising encrypted data, the encrypted data comprising access data for accessing the external data source that is encrypted using a service public key of a key management node that is external to the blockchain network;

selecting, by the relay system smart contract, a relay system node from a plurality of relay system nodes that are external to the blockchain network, wherein the plurality of relay system nodes are distributed with a service private key of the key management node;

executing, by the key management node, an attestation process with each of the plurality of relay system nodes and an attestation service, wherein the key management node executes a key distribution process with the plurality of relay system nodes, the key distribution process resulting the service private key of the key management node being distributed to the plurality of relay system nodes;

transmitting, by the relay system smart contract, the request to the relay system node;

receiving, from the relay system node and by the relay system smart contract, a return result in response to the request, the return result comprising the data retrieved from the external data source obtained by the relay system node and a digital signature, wherein the digital signature is generated based on the data retrieved from the external data source and the service private key of the key management node; and transmitting, by the relay system smart contract, the return result to the client smart contract.

14. The system of claim 13, wherein the operations further comprise:

provisioning, by an attestation process of the key management node, the service private key and the service public key of the key management node.

15. The system of claim 14, wherein the operations further comprise:

executing, by a client device, the attestation process with the key management node and an attestation service; and obtaining, by the client device, the service public key of the key management node during the attestation process.

16. The system of claim 15, wherein the return result is validated by the client device using the service public key of the key management node.

17. The system of claim 13, wherein the plurality of relay system nodes each execute a trusted execution environment (TEE).

18. The system of claim 13, wherein the request is decrypted by the relay system node to obtain the access data using the service private key of the key management node.

* * * * *